UNITED STATES PATENT OFFICE.

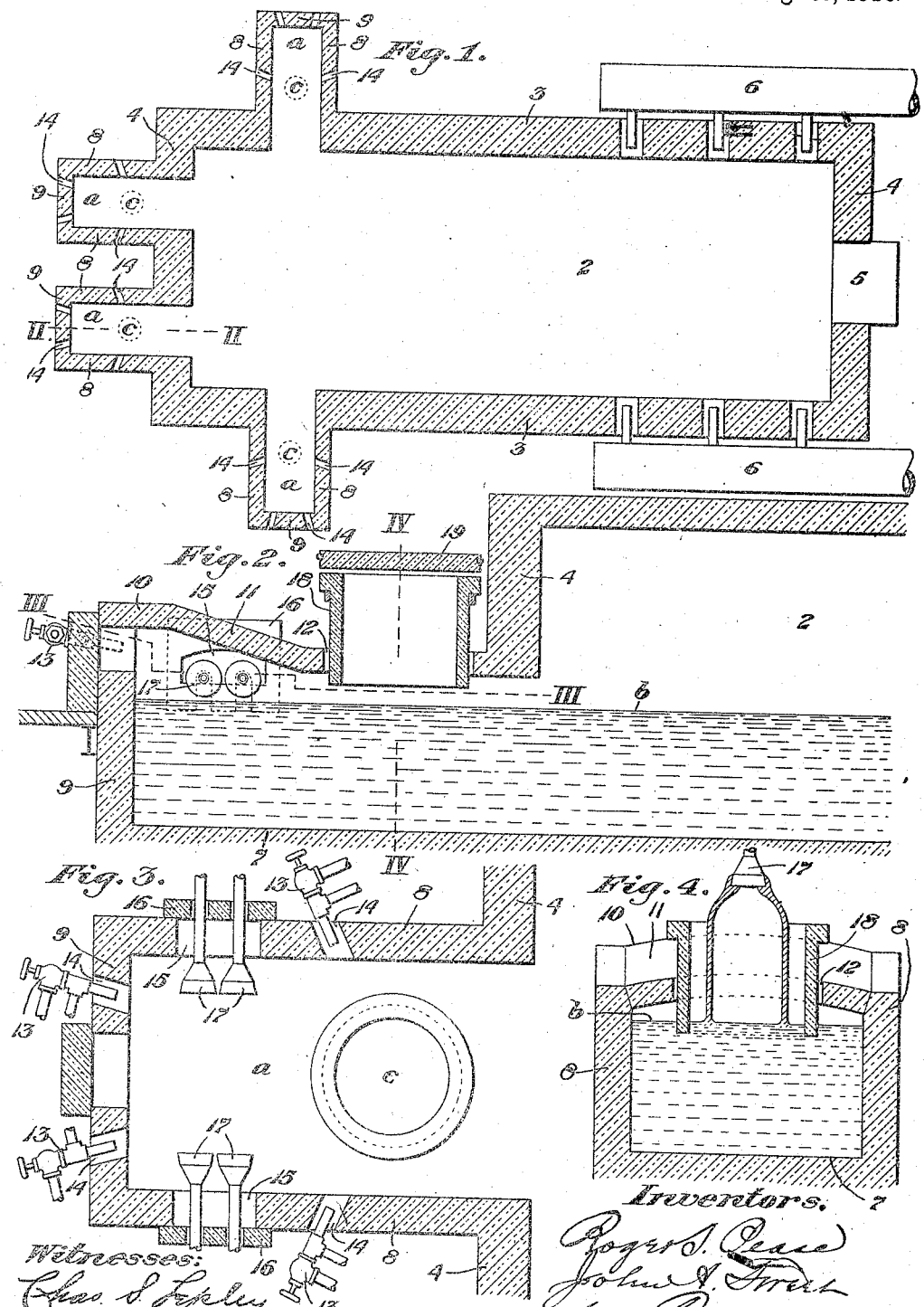

ROGER S. PEASE AND JOHN A. SWEET, OF HARTFORD CITY, INDIANA, ASSIGNORS TO ALFRED M. LEE, TRUSTEE, OF PITTSBURG, PENNSYLVANIA.

GLASS-TANK.

967,967.  Specification of Letters Patent.  Patented Aug. 23, 1910.

Application filed November 7, 1908. Serial No. 461,483.

*To all whom it may concern:*

Be it known that we, ROGER S. PEASE and JOHN A. SWEET, citizens of the United States, residing at Hartford City, in the county of Blackford and State of Indiana, have invented certain new and useful Improvements in Glass-Tanks, of which the following is a specification, reference being had therein to the accompanying drawing.

Our invention refers to improvements in glass melting tanks for use in the manufacture of window glass and is particularly designed for the purpose of providing a construction adapted to maintain the glass at a uniform heat throughout the interior of the tank, means whereby a portion of the glass in continuous communication with the main body of the tank is presented for drawing operations, means embodying lateral tank extensions for containing such a communicating body of glass and for maintaining it heated, and to various other features of construction and improvement as shall be more fully hereinafter described.

The particular features of the improvement consist in one or more laterally disposed tank extensions so constructed that the glass in the main tank will flow thereinto on the same level, the gases of combustion will circulate from the extensions to the tank interior, the glass will be heated by supplemental heaters and is adapted for vertical drawing through the cover, and whereby the construction is adapted for manipulation of the glass drawing apparatus, removal of the surplus and preparation of the surface for the next operation, with incidental provision for heating of the drawing tools, etc.

In the drawings illustrating the invention: Figure 1 is a horizontal sectional view through the entire tank and its extension chambers. Fig. 2 is an enlarged vertical sectional view indicated by the line II. II. of Fig. 1. Fig. 3 is a horizontal sectional view on the line III. III. of Fig. 2. Fig. 4 is a vertical sectional view on the line IV. IV. of Fig. 2, illustrating the drawing operation.

2 represents the main tank, of well known construction, usually rectangular in form, having side and end walls 3 and 4, respectively, with a charging opening 5 and any suitable means for supplying fuel to the interior as gas supply pipes 6, 6, having jet nozzles extending into the front portion of the furnace through the side walls, as indicated. Ordinarily heat is thus imparted to the contents of the tank at the front portion only, the heat extending throughout the entire interior by radiation, the result of which is that the glass in the farther end of the tank is not ordinarily maintained at as high temperature as that in the forward portion.

For the purpose of providing means for easy and convenient removal by drawing of portions of the glass, we provide tank extensions $a$ at suitable points around the tank, preferably at its other end, extending outwardly beyond the end and side walls as shown in Fig. 1, which tank extensions are provided with floors 7 substantially on the same general level as the floor of the main tank (see Fig. 2), and bounded within the side walls 8 and an end wall 9. The tank extensions are covered at the portion adjacent to the main tank by horizontal preferably arched roofs or cover portions 10, the covers sloping upwardly and outwardly toward the outer end as indicated at 11, whereby the inner cover is located somewhat closely adjacent to the surface $b$ of the glass for the drawing operation, and is provided with a circular opening 12 for such purpose. The cavity beneath the outer portion of the cover is also thus enlarged vertically for clearance of the fuel-supplying burners, insertion of manipulating tools for handling the rings, removal of impurities, etc., and the insertion for heating of the drawing tools.

The burners are indicated by the numeral 13, referring to any suitable fuel-supplying device, as air and oil burners, inserted through openings 14 at any suitable point or points, and preferably directed inwardly and downwardly toward the point $c$, indicating the center of the drawing operation. Any desired number of such jets may be introduced through the end or side walls or both, and when so arranged will operate to keep the contents of the tank extensions at any desired heat for drawing, supplementing the heat of the main tank, while the amount of fuel discharged may be accurately controlled and varied from time to time through one or more of the burner jets for the purpose of temporary rapid heating of the glass as desired.

A further additional and important advantage is that the supplemental heat thus furnished to the glass within the tank extensions serves to maintain it and also the main adjoining body of glass within the tank at any desired uniform degree of heat. Also, after each drawing operation, the action of the several jets being directed toward the drawing point $c$, will serve to not only quickly melt the surplus of glass falling back into the main body after severance from the drawing cylinder, but will act to force it outwardly into the main tank and away from the drawing point.

One or more openings 15 are provided through the side or end walls, covered by a suitably designed tile 16, and adapted to receive one or more drawing tools 17 into the interior of the tank extensions for preliminary heating as is ordinarily required by a separate heating furnace for such purpose. These openings are also of advantage for the insertion of a rod or other implement when desired for any purpose.

The furnace as thus constructed is adapted for drawing cylinders upwardly through opening 12, but for the purpose of facilitating such operation, protecting the cylinder-in-process from surrounding impurities, variations in the heat, air currents, etc., and for insuring a continuous supply of heated glass, we preferably employ a vertically adjustable ring 18 of fire clay or other vitreous material arranged for raising and lowering through opening 12 by any suitable means and preferably provided with a separately adjustable cover 19 adapted to retain the heat when the apparatus is not in use, by any suitable means, as indicated in Fig. 2.

When the glass is drawn by one of the usual drawing tools employed in this art for the purpose of making a mechanically drawn cylinder, the ring 18 is lowered until its lower portion is immersed below the surface of the glass as in Fig. 4, after which the tool is lowered within it and the drawing operation proceeded with in the well known manner.

If desired one or more rings of any suitable construction or design may be employed as shown and described in our companion application filed herewith Serial No. 461,484, and it will be understood that the furnace construction is available and adapted for use with any of such various additional elements without impairing its usefulness and advantages.

We are aware that it is not broadly new to provide means for maintaining a body of glass in communication with a main supply within the tank or other containing vessel, but believe we are the first to construct a tank having a lateral extension wherein open communication is maintained above the surface of the glass with the main interior and having the various means which we have shown and described for furnishing fuel in combustion therethrough, with the several other features of construction and advantage herein set forth.

It will be understood that the construction may be greatly changed or modified by the skilled mechanic or builder, or adapted to other operations than those of drawing cylinders, and we therefore do not desire to be limited to the specific construction herein set forth, but wish to include all such changes or variations within the scope of the following claims.

What we claim is:—

1. A glass tank having an extension in open communication with the interior of the tank, closed against outward circulation of the gases, provided with a covering closely adjacent to the surface of the glass at its inner portion and sloped upwardly at its outer portion and having a drawing opening, the side walls of said extension having openings therethrough leading underneath the upwardly sloping portion of the covering, and coverings for said openings, substantially as set forth.

2. A glass tank having an extension in open communication with the interior of the tank, closed against outward circulation of the gases, provided with a covering closely adjacent to the surface of the glass at its inner portion and sloped upwardly at its outer portion and having a drawing opening, the side walls of said extension having openings therethrough leading underneath the upwardly sloping portion of the covering, fuel inlet devices extending inwardly through some of said openings, and coverings for the others of said openings, substantially as set forth.

3. The combination with a glass tank, of a horizontally arranged extension thereof in open communication with the interior of the tank, closed against outward circulation of gases provided with a supporting bottom and rectangular side and end walls having covered openings therethrough, a covering having a straight and inclined portion, and fuel supply devices arranged to furnish fuel in combustion downwardly and inwardly toward the tank, substantially as set forth.

4. The combination with a glass tank, of a horizontally arranged extension thereof in open communication with the interior of the tank, closed against outward circulation of gases provided with a supporting bottom and rectangular side and end walls having covered openings therethrough, a covering having a straight portion provided with a drawing opening and a vertically adjustable ring, an outwardly and upwardly inclined end portion, and fuel supply devices arranged to furnish fuel in combustion downwardly and inwardly toward the tank, substantially as set forth.

In testimony whereof we affix our signatures in presence of two witnesses.

ROGER S. PEASE.
JOHN A. SWEET.

Witnesses:
FRED W. WILLMAN,
DAVID C. CALDWELL.